Jan. 30, 1951        C. G. PETERSON        2,539,753
AIRCRAFT CONTROL COLUMN

Filed Oct. 30, 1946        8 Sheets-Sheet 1

Inventor
Carlton G. Peterson
By Lyon & Lyon
Attorneys

Jan. 30, 1951  C. G. PETERSON  2,539,753
AIRCRAFT CONTROL COLUMN

Filed Oct. 30, 1946  8 Sheets-Sheet 5

Inventor
Carlton G. Peterson
By Lyon & Lyon
Attorneys

Jan. 30, 1951   C. G. PETERSON   2,539,753
AIRCRAFT CONTROL COLUMN
Filed Oct. 30, 1946   8 Sheets-Sheet 6
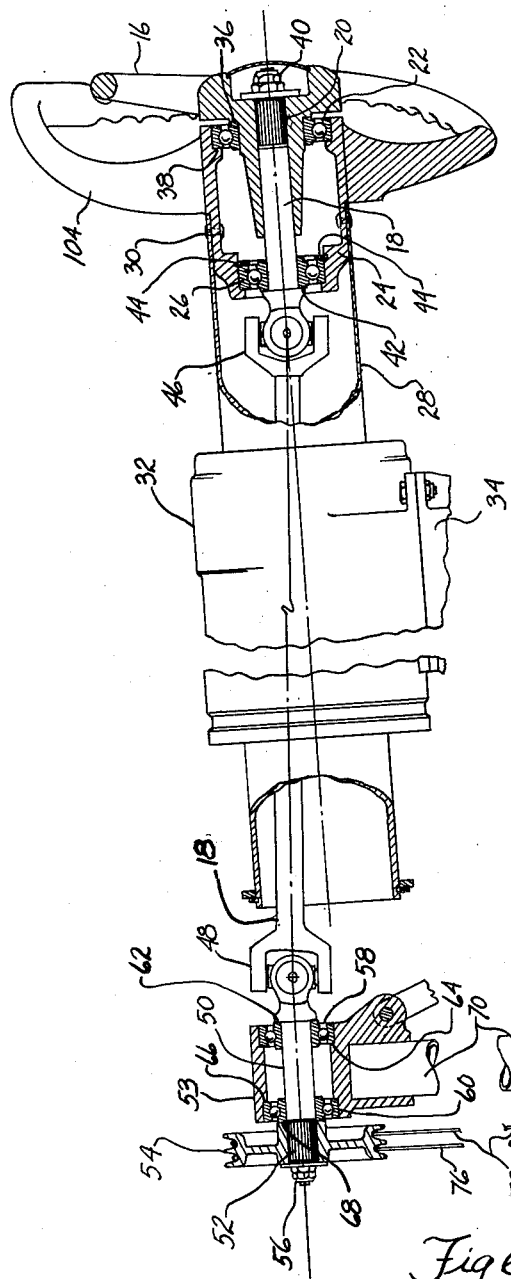
Inventor
Carlton G. Peterson
By Lyon & Lyon
Attorneys

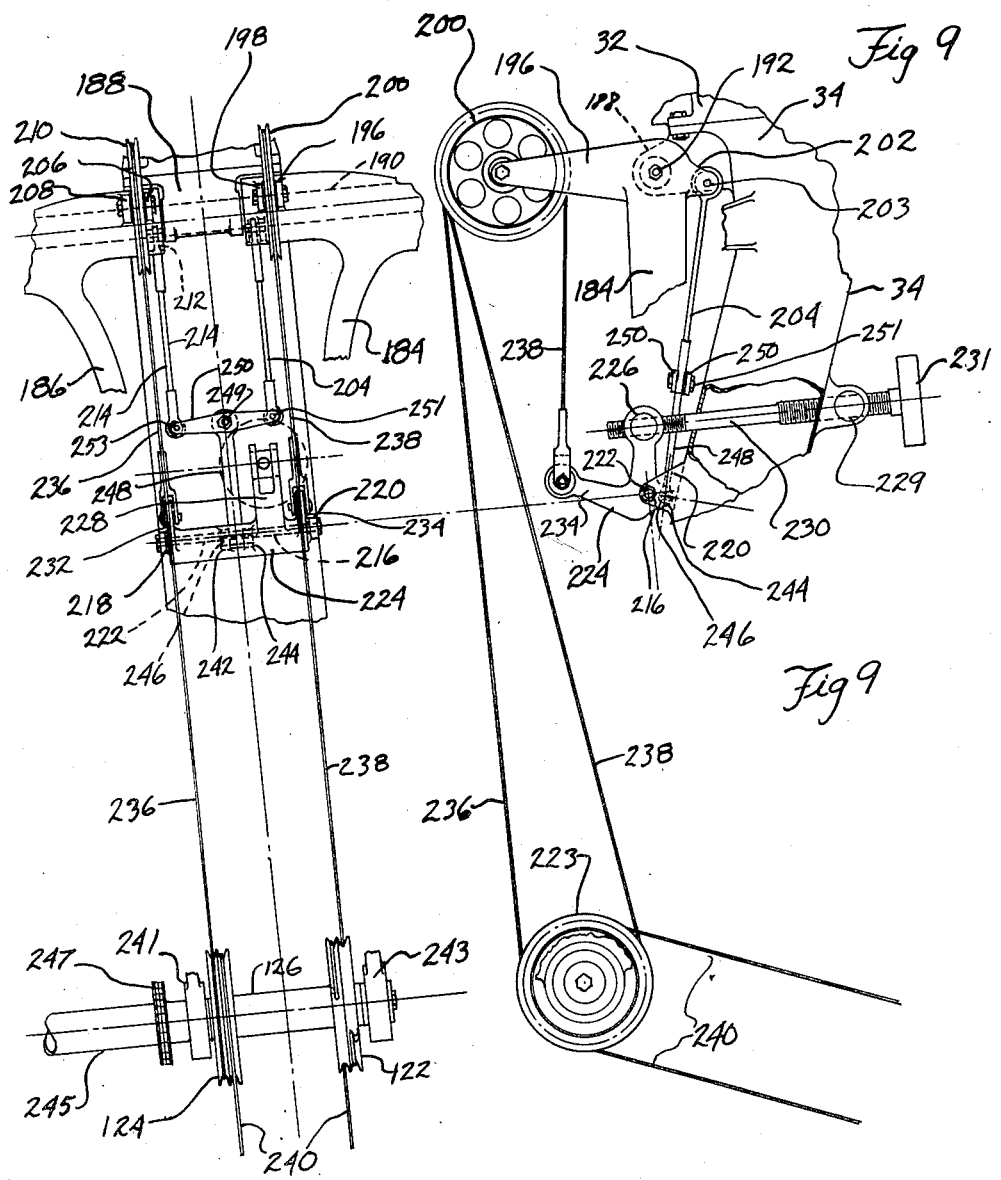

Jan. 30, 1951     C. G. PETERSON     2,539,753
AIRCRAFT CONTROL COLUMN

Filed Oct. 30, 1946     8 Sheets-Sheet 8

Inventor
Carlton G. Peterson
By Lyon & Lyon
Attorneys

Patented Jan. 30, 1951

2,539,753

UNITED STATES PATENT OFFICE 2,539,753

AIRCRAFT CONTROL COLUMN

Carlton G. Peterson, Los Angeles, Calif., assignor to Tison Engineering, Inc., Los Angeles, Calif., a corporation of California Application October 30, 1946, Serial No. 706,592

8 Claims. (Cl. 244—83)

My invention relates to an aircraft major flight control system and more particularly a control column composite unit adapted for installation in aircraft and connection with the aircraft control cables and landing gear brake mechanism.

Heretofore control systems in aircraft have tended to be of varying designs, each design comprising a number of pieces of equipment which are integral parts of the particular aircraft cockpit. This results in a different type of control system for each aircraft, high cost, duplication of design, and, most important, each aircraft necessarily has its controls in different positional relationships. Pilots must be checked out in cockpit procedure for each aircraft separately, and even after this is done, natural human error sometimes occurs through lack of standardized control positions and accidents ensue.

It is the principal object of my invention to provide a complete aircraft cockpit control column as a composite unit which can be adapted to more than one type of aircraft as a single furnished piece of equipment and thereby provide standardization of control position as well as standardization of the mechanism itself.

A further object is to provide a control column including controls for rudder, aileron, elevator, nose wheel steering, brakes, and rudder pedal adjustment all in a single, separately manufactured, unit-installed device.

Moreover, it is an object to so construct my control column that, while meeting the functional and safety requirements of the Services and of the Civil Aeronautics Authority, by its integral nature it is freely replaceable, thus simplifying installation, servicing, quantity production, and low unit-cost problems.

Yet another object is to so relate and integrate the various control functions operating through the control column that, although stress standards and strength requirements are met, extremely lightweight construction may be used throughout, thus increasing aircraft payload.

It is another object of the present invention to so design the unit to allow a minimum of friction of the integral moving parts and to permit a maximum of rigidity while at the same time giving due consideration to weight and to the elimination of backlash in the controls.

Again, it is my object that the above relation and integration of control functions be so adjusted as to place the various controls in such position as to be, in effect, functions of the pilot rather than functions of the particular aircrafts.

Various other objects and advantageous features of this invention may be had from the following description, and one embodiment thereof may be seen in the accompanying drawings wherein similar characters of reference designate corresponding parts, and wherein:

Figure 6 shows an enlarged side elevational view, partly in section and partly broken away, of a portion of my control column;

Figure 7 shows a sectional view of a portion of my control column taken along the line 7—7 of Figure 6;

Figure 8 shows an elevational view of a portion of my control column controlling the aircraft rudder;

Figure 9 shows a side elevational view of the same portion of my control column.

Figure 1:
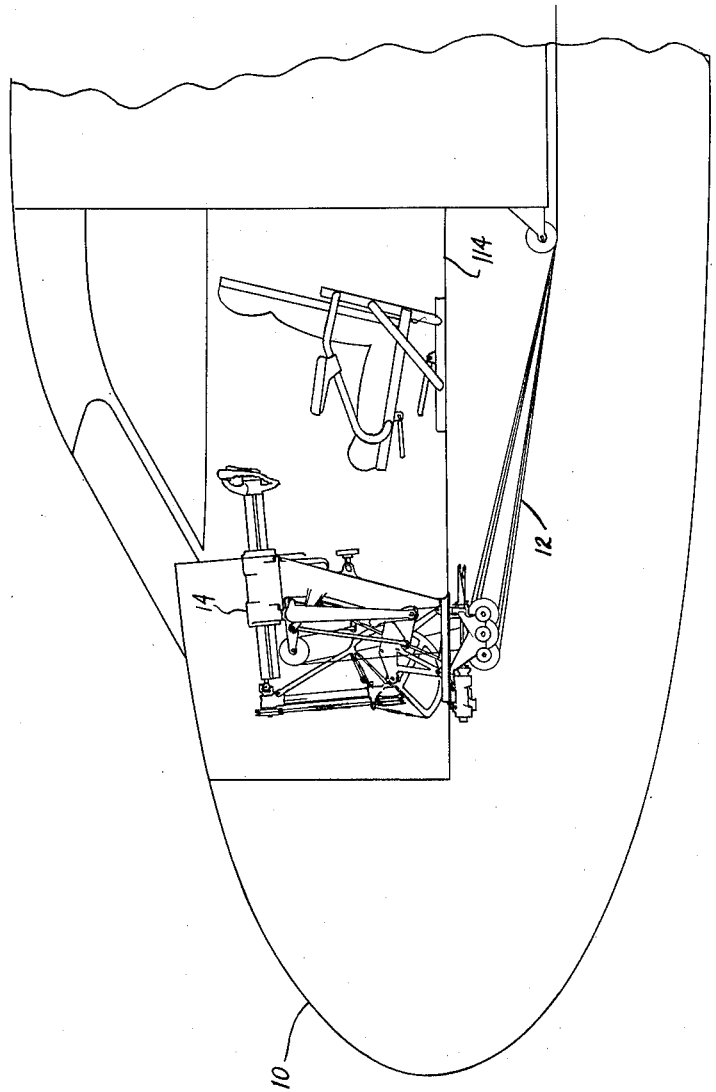
Figure 1 shows diagrammatically the forward section of an aircraft having therein a control column incorporating my invention.

Referring to the drawings, an aircraft 10, having standard, conventional control surfaces and common cables 12 leading thereto, has installed therein the control column 14. The control column 14 is an integral unit and is adapted for control of nose wheel, elevator, ailerons, rudder, and brakes, including means provided for rudder pedal adjustment.

Nose wheel

Figure 2:
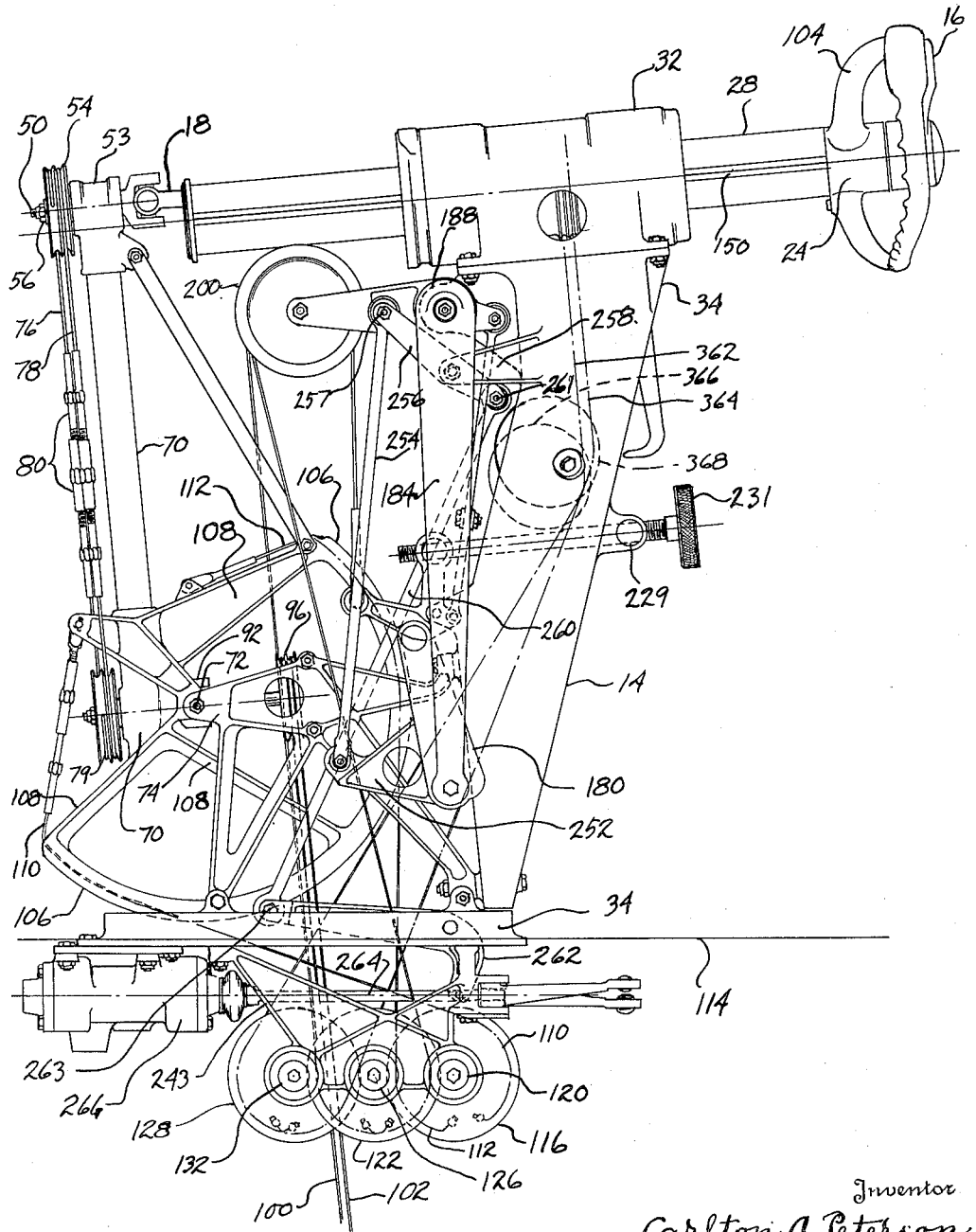
Figure 2 shows a side elevational view of my control column.
Figure 3:
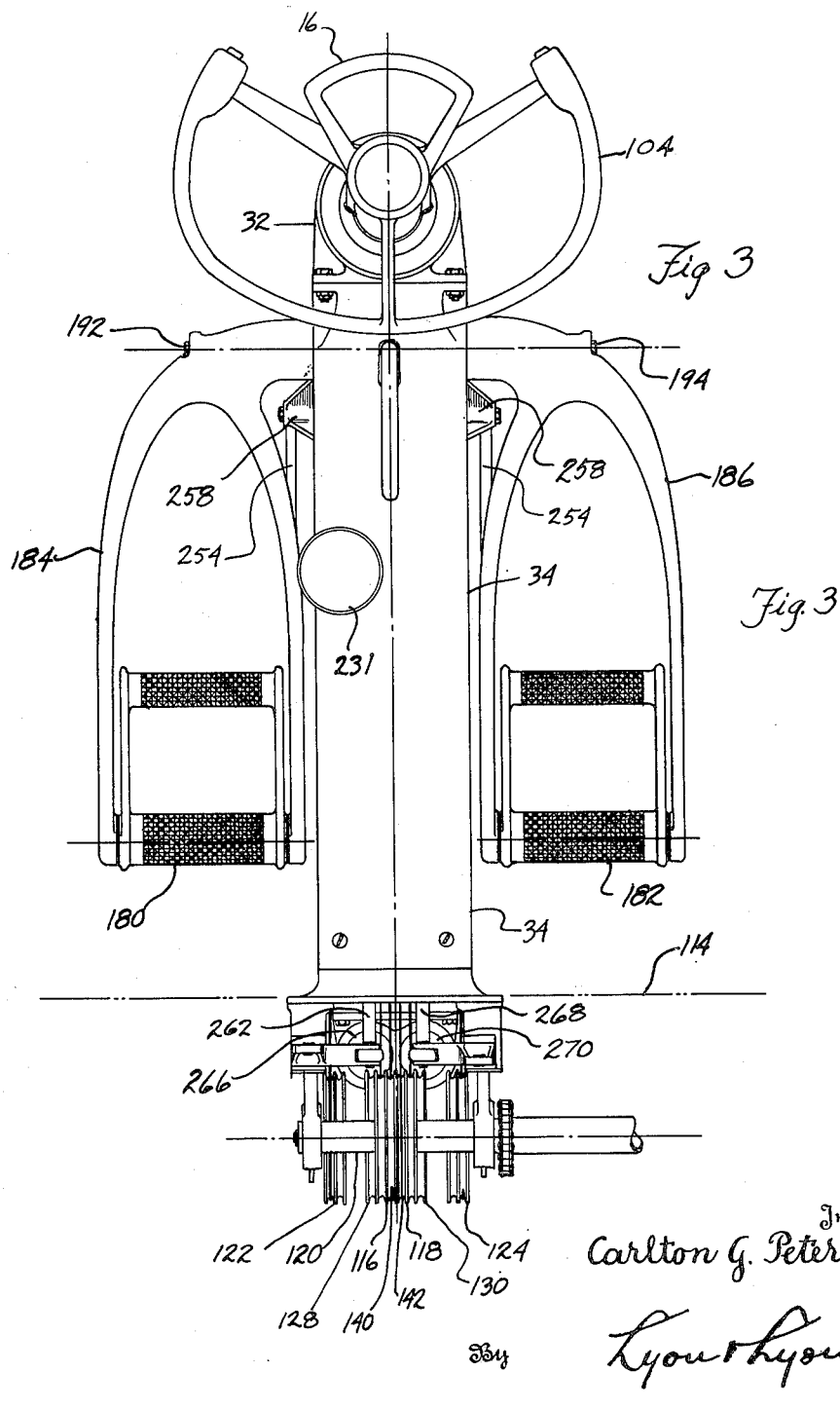
Figure 3 shows a rear elevational view of my control column.

The nose wheel control wheel 16, referring particularly to Figures 2, 3, and 6, is connected to the shaft 18 by grooves and serrations 20. The said nose wheel control wheel 16 is rotatably supported by ball bearing 22 in aileron wheel hub 24 while the shaft 18 is similarly supported by bearing 26. The aileron wheel hub 24 fits telescopically in tube 28 and may be riveted thereto by rivets 30. As will appear later, the said tube 28 is slidably and rotatably supported in the housing 32 which is supported by the frame 34. The nose wheel control wheel 16 is held from fore and aft movement with respect to the tube 28 by the shoulders 36 and 38, the king nut 40, the flange shoulder 42, and the lock ring 44.

The shaft 18 passes freely through the tube 28 and the housing 32 by virtue of two universal joints 46 and 48, and connects with the shaft 50. The shaft 50, by serrations and grooves 52, carries a sheave 54 which is secured to the end of shaft 50 by king nut 56. Shaft 50 is rotatably supported in the bearing housing 53 by the ball bearings 58 and 60 and is held from fore and aft movement with respect thereto by flanged shoulder 62, shoulders 64, 66, and 68, the sheave 54, and the king nut 56.

The bearing housing 53 has press fitted into a bore therein the tube 70 and comprises with said tube 70 a bell crank pivoted on a horizontal pivot line at 72 on hanger 74 which brackets the said bell crank 70 and which is bolted to the frame 34, as shown. The sheave 54 is double channeled and has cables 76 and 78 connected to a second sheave 79 in common manner, the two cables having oppositely directed windings in different grooves on the same sheaves and having their respective ends secured to said channels in said sheaves so that a turning of sheave 54 will result in a correspondingly rotationally directioned turning of sheave 79. Turnbuckles 80 prevent looseness in cables 76 and 78.

The bell crank 70 rotatably supports through ball bearings 82 and 84 the shaft 86, exactly as does the bearing housing 53 support shaft 50; and by serrations and grooves 88, shaft 86 carries the sheave 79. Shaft 86 is connected to shaft 90 through a universal joint 92, shaft 90 carrying by serrations and grooves 94 the sheave 96 and being rotatably supported in the hanger 74 by the ball bearing 98. It is notable that since the only movement of sheave 96 with respect to hanger 74 and frame 34 is rotational, the center of the universal joint 92 must fall on the pivot line 72.

The sheave 96, like the sheaves 54 and 79, is double channeled, having the cables 100 and 102 oppositely wound in each channel and being anchored thereto. The cables 100 and 102, of course, lead to well-known aircraft nose wheel steering mechanism.

*Elevators*

As in the case of the nose wheel mechanism, the elevator mechanism functions through the shaft 18. The aileron wheel 104, unitary with the aileron wheel hub 24 is of course rigid with the tube 28 and will translate the shaft 18 forward by virtue of the lock ring 44 and shoulder 42, while it will translate the said shaft 18 aft through shoulders 38 and 36 and king nut 40. When shaft 18 is translated with respect to the frame 34, it is permitted to slide through the housing 32 by a bearing arrangement to be described in connection with the aileron control.

Since shaft 18 connects through the two universal joints 46 and 48 to shaft 50, and since shaft 50 is relatively rigid with respect to bearing housing 53 and bell crank 70 except rotationally, translation of the aileron wheel 104 will result in pivoting the bell crank 70 about the pivot line 72 with respect to the hanger 74 and frame 34.

Since a sector 106 is unitary and rigid with respect to the bell crank 70 and a part thereof being connected thereto by the spokes 108, such sector rotates as the bell crank 70 so pivots. The periphery of the said sector 106 is grooved and carries cables 110 and 112 which are connected to the bell crank 70 by common means as shown, but which, somewhat similarly to the prior described sheave cables, are wound in opposite directions about the said sector 106.

As a part of the control column 14, and normally beneath the aircraft cockpit floor 114, are a number of drums forming a series of sheaves, each sheave being double channeled as before. Each of the drums comprises a pair of such sheaves. Sheaves 116 and 118 comprise a drum unit, while the other sheave pairs are on separate shafts. Thus, reference to Figures 2 and 3 shows that 116 and 118, the elevator sheaves, are on the same shaft 120 and side by side, forming a drum.

Sheaves 122 and 124, as will later be shown, are the rudder sheaves and are on the shaft 126 immediately forward of shaft 120 but are well apart from each other, while sheaves 128 and 130, the aileron sheaves, are on shaft 132 and are fairly well apart, but half of each showing in Figure 3.

As with the cable and sheave systems previously described, the cables 110 and 112 from the sector 106 are wound in opposite directions in the channels 140 and 142 and affixed thereto, as shown in Figure 2. However, as shown in Figure 3, the channels 140 and 142 are in different sheaves 116 and 118, respectively, and the remaining channel in each sheave 116 and 118 is utilized to receive and have affixed thereto a cable of the cables 12, the two cables leading to the common elevator mechanism.

*Ailerons*

Whereas operation of the elevator function depends upon translation of the tube 28 through the housing 32, rotation of such tube 28 causes the ailerons to work. As aforesaid, the aileron wheel 104 and the tube 28 are rigid with respect to one another, and therefore a turning of the said aileron wheel 104 turns the tube 28. The tube 28 slides within a drum 146 carried rotatably by the housing 32 on the ball bearing 148, as shown in Figure 4.

The tube 28 has on either side the tracks 150 and 152 and, to permit these tracks to slide through drum 146, the said drum is notched as at 154 to provide clearance.

Figure 4:
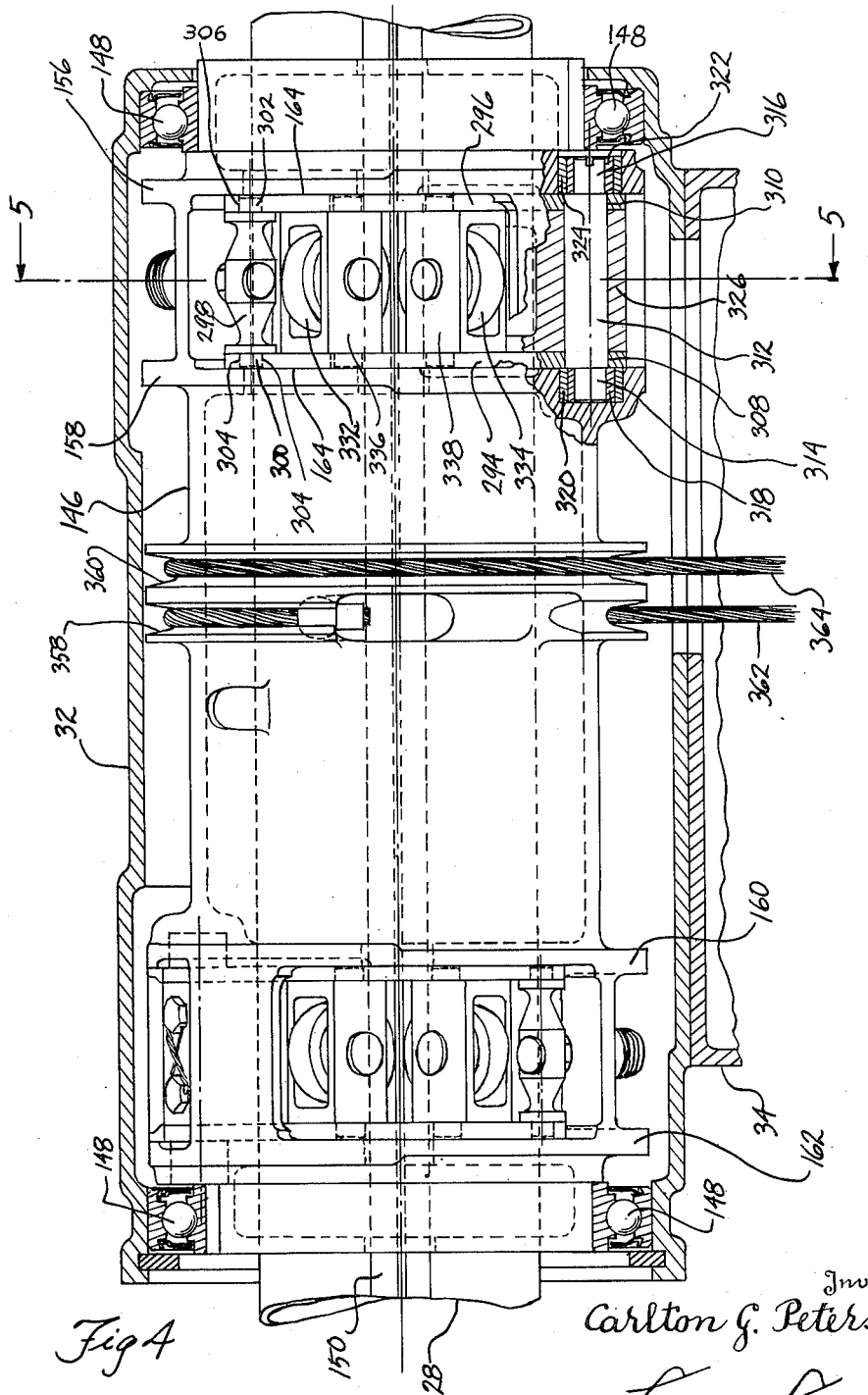
Figure 4 shows an enlarged side elevational view, partly in longitudinal section and partly broken away, of a portion of my control column.
Figure 5:
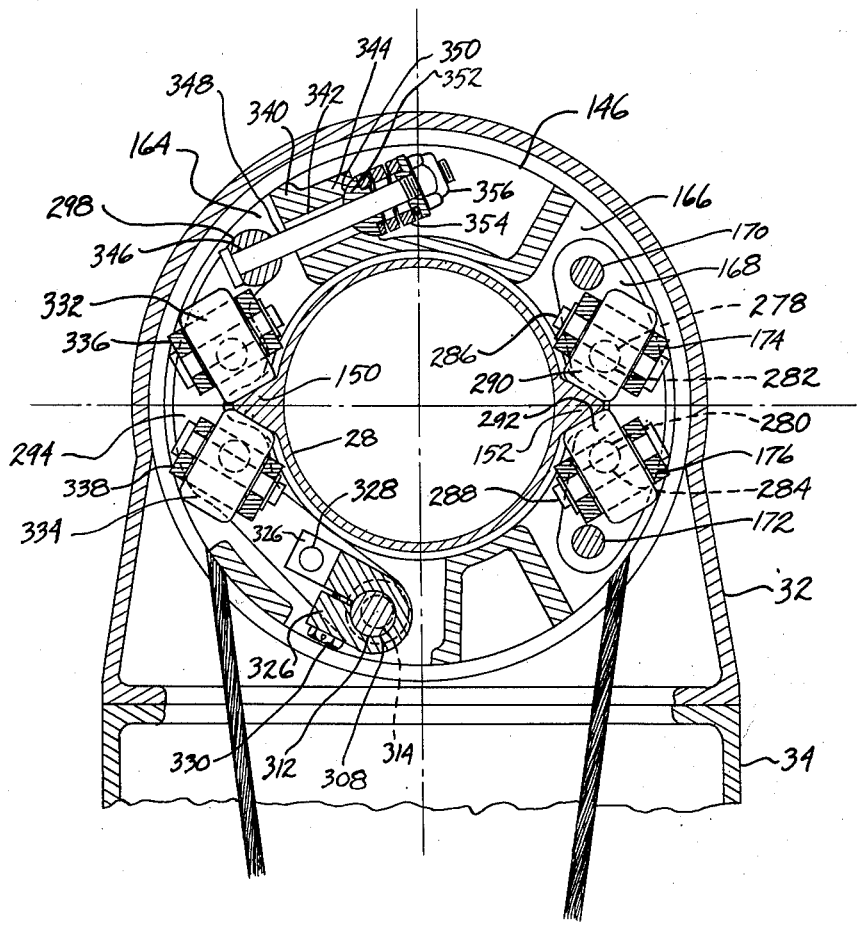
Figure 5 shows a cross-sectional view of a portion of my control column taken along the line 5—5 of Figure 4.
Figure 10:
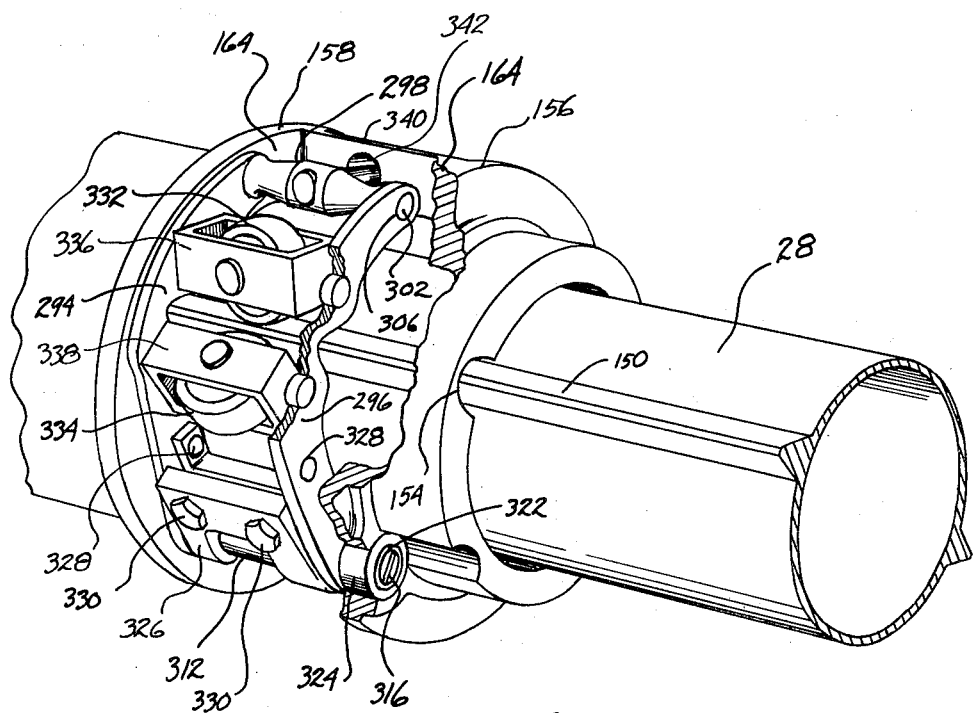
Figure 10 shows an enlarged perspective view, partly broken away, of a portion of my control column.

The drum 146 is a cast member and, as shown in Figures 4, 5, and 10, is adapted to carry roller bearing supports for the tracks 150 and 152 of the tube 28. Four flanges 156, 158, 160, and 162 define openings for the aforesaid bearing supports in the drum 146. The four mentioned openings are about the periphery of the drum 146 on opposite sides of the said drum and at both ends, each pair carrying, respectively, a set of idler roller bearings and a set of spring loaded roller bearings, said sets of idler bearings being on the one side of the drum 146 and the sets of spring loaded bearings being on the other side thereof. The opposing sets of bearings at each extremity of the drum 146 are exactly the same except, as will later be described, the spring loaded bearings are reversed with respect to each other.

Figure 5 shows an opposing set of bearings at one end of the drum 146, it being understood that such view is taken on the line 5—5 of Figure 4 and that the bearings at the other end are the same but reversed in one respect as aforesaid. As shown in Figure 4, the flange 158 of the drum 146 has flat arcuate faces 164 and 166, and it is understood that the flange 156 likewise provides faces matching and opposing the said faces 164 and 166. The idler bearing sets, both at one side of the drum 146, are exemplified in Figure 5, which shows but one set at one end of the said drum. They comprise the plate 168 and a matching facing plate (not shown) and identical, both of which lay flat against face 166 and its opposite. The aforesaid plates are pinned to their respective flange faces as by the pins 170 and 172 and carry roller housings 174 and 176. Such roller housings 174 and 176 have the studs 278 and 280 rotatably received in holes 282 and 284 of the plate 168 and have oppositely projecting studs received in the matching plate pinned to the flange facing flange 166. Within the roller housings 174 and 176 are rotatably carried on the shafts 286 and 288 the roller bearings 290 and 292 which ride against the track 152 of tube 28. As aforesaid, a precisely similar idler bearing assembly exists at the same side but at the other extremity of drum 146, similarly bearing against track 152.

The track 150 at the other side of the tube 28 is supported in turn by the aforementioned spring loaded roller bearing sets at the side of drum 146 opposite the idler bearing sets. Similarly with the said idler bearing sets, the spring loaded bearing sets fit within openings provided by flanges 156 and 158 and by flanges 160 and 162. Flanges 156 and 158 have arcuate faces 164 and the plates 294 and 296 are adapted to lie thereagainst and slidably pivot thereon. The plates 294 and 296 are spaced at their upper extremities by a spacer 298 having stud shafts 300 and 302 received in holes 304 and 306 of plates 294 and 296, respectively. The plates at their lower extremities have hubs 308 and 310 which receive the eccentric shaft 312, said eccentric shaft being eccentrically mounted on projecting stub shafts 314 and 316 which are themselves concentric with respect to each other. Stub shaft 314 exercises a collar 318 mounted in a rubber bushing 320 in flange 158 while stub shaft 316 carries a collar 322 mounted in a rubber bushing 324 in flange 156. Carried on the eccentric shaft 312 and spacing the plates 294 and 296 is the clamp 326. The said clamp 326 is riveted to each plate 294 and 296 as at 328 in Figure 5 and is clamped about the eccentric shaft 312 by the screws 330.

Between the plates 294 and 296 are mounted the rollers 332 and 334 within their respective housings 336 and 338 precisely as are the rollers 290 and 292 of the idler bearing set, and bear against the track 150. Since the plates 294 and 296 are clamped by the clamp 326 to the eccentric shaft 312, which pivots about the axis of the stub shafts 314 and 316 with respect to the flanges 156 and 158, it is of course necessary to load the rollers 332 and 334 against the track 150. Between the flanges 156 and 158, therefore, is provided a bridge 340, which has a bore 342 extending therethrough and through a built-out portion 344. A bore 346 exists in the spacer 298 and passing through the bores 342 and 346 is the headed bolt 348 which has a threaded extremity. The built-out portion 344 is provided with a spherical seat 350 which seats the spherical bushing 352. The spherical bushing 352 slides upon the bolt 348 and is abutted against by the compression spring 354. A nut 356 threads over the bolt 348 and a washer exists between said nut 356 and said spring 354.

At the opposite extremity of the drum 146 exists a spring loaded bearing set precisely the same as the aforesaid. As shown, however, in Figure 4, and for a reason later to be described, this set is, in effect, upside down in relation to the spring loaded bearing set just described. Thus, as shown in Figure 4, the clamp screws of this bearing set are at the drum top while the compression spring is at the drum bottom in the position of the drum as shown. In the bearing set just described, compression spring 354 is atop the drum while clamp 326 is at the bottom thereof.

About the periphery of the drum 146 are the channels 358 and 360 to which are anchored and about which are oppositely wound the cables 362 and 364. As shown by Figure 2, these cables lead respectively over idler sheaves 366 and 368 and to their respective sheaves on the shaft 132, cooperating with such sheaves and with cables 12 to operate, in manner heretofore described, the common control surfaces.

Rudder

The rudder pedals 180 and 182 are hinged respectively to yokes 184 and 186. A hanger 188 extends as part of frame 34 and is bored therethrough to receive a shaft 190. The shaft 190 pivotally supports the yokes 184 and 186 which are held thereon by the nuts 192 and 194 which are screwed over the threaded ends of shaft 190.

As shown in Figure 9, each of the above yokes as a unitary part has cranks on either side of its hinge line as cranks 196 and 198 extending from yoke 184, which carry the sheave 200, and crank 202 which is connected to turnbuckle 204 by a pinned joint 203. Likewise, yoke 186 has cranks 206 and 208 carrying sheave 210, and crank 212 connected to turnbuckle 214.

A shaft 216 is carried by the frame 34 on hangers 218 and 220, and said shaft passes through a bore 222 in a bell crank 224 which is pivotally supported thereby. The bell crank 224 carries a trunnion 226 on an arm 228 into which is threaded the shaft 230. A second trunnion 229, oppositely threaded from trunnion 226, is carried on the frame 34 and into this is threaded the shaft 230 which ends in adjusting wheel 231. Bracketing the arm 228 are two lever arms 232 and 234 to which are connected the cables 236 and 238 which pass respectively over sheaves 210 and 200, to sheaves 225 and 223. The cables 240 extend to a common rudder mechanism, the cables 236, 238, and 240 being attached to the sheaves 225 and 223 similarly to the sheave attachments heretofore described.

As shown in Figure 8, the shaft 126 is carried rotatably by the frame 34 by the hangers 241 and 243 which are bolted in the frame 34 and extend below the cockpit floor 114. A conventional chain coupling 247 couples the shaft 245 to turn with the said shaft 126. Shaft 245 may be used to buss dual control columns together, or may be used to connect with the aforesaid control surfaces in well-known manner, or both. It is to be noted that shafts 128 and 132 may be similarly extended.

The bell crank 224 has on the other side of the shaft 216 from lever arms 232 and 234 short lever arms 242 and 244 which carry a shaft 246 which passes through an eye on rod 248. Rod 248 carries pivotally on a pivot pin 249 the rocker members 250 to which in turn are pivotally attached the turn buckles 204 and 214 by shafts 251 and 253.

Brakes

As heretofore stated, the rudder pedals 180 and 182 are hinged on the yokes 184 and 186.

The pedals 180 and 182 are built out as at 252 and the extended portion 252 is pivotally connected to rod 254 by a clevis end thereon, and the rod 254 is in turn pivotally connected to a link 256 by a pin and bearing connection 257. Link 258 is pivotally supported by the hanger 258 which extends from frame 34 and pivotally carries the rod 260 by another pin and bearing connection 261. The rod 260 is hinged to bell crank 262 at joint 263, and the bell crank 262 is pivotally carried by the frame 34 and coacts with push rod 264 to operate the hydraulic brake cylinder 266. Likewise, pedal 182 is linked to a bell crank 268 and operates brake cylinder 270.

*Operation*

As is obvious from the description of the structure, the operation of the nose wheel control consists in turning the nose wheel control wheel 16 which, through universal joints 46 and 48, turns the shaft 50 and the sheave 54. Rotation of the sheave 54 through the cables 76 and 78 turns the sheave 79, and said sheave being keyed to the shaft 86, this shaft rotates through the universal joint 92, the shaft 90, and therefore the sheave 96. Rotation in either direction of the sheave 96 of course operates the cables 100 and 102 which lead to the common nose wheel mechanism. It is notable that translation of the tube 28 and therefore of the shaft 18 will not affect the operation of the nose wheel in that the two universal joints 46 and 48 will take care of both the translational movement of the said tube 28 and the nose wheel control wheel 16 and the arc-like movement of the shaft 50 in the bearing housing 32.

Operation of the elevators is occasioned by grasping the aileron wheel 104 and translating the same with respect to the frame. Since the tube 28 is rigid with the aileron wheel 104, such tube translates within the housing 32 and the drum 146. As aforesaid, the tracks 150 and 152 ride respectively upon spring loaded bearings on drum 146 on the one side and idler bearings on drum 146 on its other side. Also as aforesaid, such bearing support is relatively frictionless, and it will be noted that to reduce this friction the loading of the compression springs 354 is kept at a minimum. Translation of the tube 28 of course translates the shaft 18 which in turn moves the bearing housing 53 and rotates the bell crank 70 about the pivot line 72. Rotation of such bell crank causes corresponding rotation in the sector 106 and operates the cables 110 and 112 and thereby the sheaves 116 and 118. As is apparent from the description of the structure, the proper two cables of the cables 12 operate the elevator control surfaces.

The ailerons are operated, of course, by the aileron wheel 104 which is rigid with the tube 28. The tube 28 which slides within respective roller bearings on the drum 146, when rotated, causes a corresponding rotation in the drum 146 and in the cables 362 and 364. These cables operate their respective sheaves on the shaft 132 and the proper pair of cables among the cables 12 causes the aileron control surfaces to assume their proper positions.

Referring particularly to Figure 5, which is a cross-section through the drum 146 and housing 32, it will be seen that a clockwise torque upon the tube 28 will cause a forced couple to exist between the roller 292 and the track 152 on the one hand and the roller 332 and the track 150 on the other. The force from the track 152 operates through the roller 292, the shaft 288, the roller housing 176, the studs 280, the plate 168, and hence through the pins 170 and 172 and the drum 146. It will be noted in this respect that the force from the track 152 operates on the roller 292 perpendicular to its axis of rotation in the housing 176.

With respect to the spring loaded bearing sets, the resultant line of force from the track 150 to the roller 332 again is perpendicular with respect to the roller axis within its housing, and the stub shafts 314 and 316 of the eccentric shaft 312 are so placed that the line of force passes substantially through the hinge line of the said plates 294 and 296. Thus when a clockwise torque is placed upon the tube 28, such force does not work against the spring 354 but rather works directly through the roller 332, the roller housing, the studs on the said roller housing, the plates 294 and 296, the eccentric shaft 312, and the stub shafts 314 and 316 to the drum 146.

It will be noted that the reason for the pivotal arrangement of the plates 294 and 296 is to allow the rollers 332 and 334 to resiliently bear against the track 150 and in turn to cause the track 152 to resiliently bear against the rollers 290 and 292 in order to avoid backlash yet render friction negligible on translation. It will also be noted that the eccentric mounting of the plates 294 and 296 is for the purpose of permitting a simple adjustment of the said plates to allow the respective spring roller sets at either extremity of drum 146 to align with each other and to align with the track 150. The clamp 326, since it is pinned to the plates 294 and 296, locks the said plates rigidly with respect to each other, and to the eccentric shaft 312. The rubber bushings 320 and 324 are to allow slight self-adjusting of the plates 164 to compensate for any inaccuracy or, in other words, twisting, in the tube 28. Again it will be noted that the rollers 290, 292, 332, and 334 and their corresponding elements at the other extremity of the drum 146 are mounted in their respective roller housings which are rotatable with respect to the plates 294 and 296 in order to allow such rollers to self-adjust to maintain at all times line contact with the tracks 152 and 150.

As aforesaid, the extremity opposite the drum 146 extremity specifically described is the same with the exception, however, that, while remaining on the same side of the drum 146, the other spring loaded bearing assembly is reversed. The purpose for that is that, in the rotation of the tube 28 in counterclockwise direction, it is desired that the same relation of elements shall exist at such extremity of the drum 146 as exists in the described end when rotated in a clockwise direction. It will be seen that so reversing the spring loaded roller assembly the result is, when the tube 28 is rotated in counterclockwise direction, that the force line passes through the hinge line of the plates matching the plates 164 and thus the spring matching the spring 354 remains uneffected as does the spring 354 itself. Therefore, with the matched bearings as described, either a clockwise or a counterclockwise torque may be delivered into the tube 28, and the reaction in the drum 146 will be positive and immediate.

In the operation of the rudder control of my control column, pressure, for example, on the pedal 180 pivots the yoke 184 about the frame, raises the sheave 200 and, since the bell crank 224 is locked with respect to the frame, operates the cable 238 which operates its respective sheave 122 and through the cable 240 of the cable 12 actuates the rudder in the desired direction. Similarly pressure on the pedal 182 lifts the sheave 210 and turns the sheave 124. It will be noted that the cables 236 and 238 are affixed to their respective sheaves on the shaft 126 in such manner that a moving forward of the one rudder pedal will cause the other to move aft. In aid of this feature, there are provided the turnbuckles 204 and 214 on the rocker arm 250. When, for example, rudder pedal 180 is pushed forward lifting the sheave 200, the crank 202 depresses causing the turnbuckle 204 to move downward, the turnbuckle 214 to move upward, therefore rocking the yoke 186 and rudder pedal 182 aft. Turnbuckles 204 and 214 are also provided in order that slack in the cables 236 and 238 may be adjustably prevented. The rudder pedals may be adjusted together fore and aft by turning the adjusting wheel 231. Since the trunnions 226 and 229 are oppositely threaded, such turning of the adjusting wheel 231 rocks the bell crank 224 with respect to the frame. Thus, either depressing the sheaves 200 and 210 and rocking the yokes 184 and 186 and their pedals 180 and 182 aft or permitting said sheaves 200 or 210 to raise thus allowing the pedals 180 and 182 to move forward together. It will be noted that the moment arm between the shaft 246 and the shaft 216 is on the other side of the hinge shaft 216 from the bell crank proper, and thus acts to prevent tightening or slackening in the cables 236 and 238 due to rotation of the adjusting wheel 231 without readjustment of the turnbuckles 204 and 214.

The operation of the brakes is of course obvious from the description of their structure. Pressure by the pilot with the toes on the pedals 180 or 182 pivots the bell cranks 262 or 268 with respect to the frame 34 and coact with the push rods 264 to actuate the brake cylinders 266 and 270 which themselves are affixed to the said frame.

Having fully described my invention, it is to be understood that I do not wish to be limited to the details herein set forth, but my invention is of the full scope of the appended claims.

I claim:

1. In a unitary control assembly, an aileron control wheel, a frame structure slidably supporting said aileron control wheel, a nose wheel control wheel rotatably mounted with respect to said aileron control wheel, a bore in said nose wheel control wheel, a shaft keyed within said bore, said shaft being rotatably supported at one portion thereof by said aileron control wheel, said nose wheel control wheel and said shaft being able to rotate with respect to said aileron control wheel but otherwise rigid therewith, a second shaft universally connected to said first shaft, a bell crank assembly pivotally supported by said frame structure, a third shaft universally connected to said second shaft and rotatably supported in said bell crank assembly, a sheave keyed on said third shaft, means operatively connecting said sheave with the aircraft nose wheel, and means operatively connecting said bell crank assembly with the elevator control surfaces.

2. In a unitary control assembly, an aileron control wheel, a frame structure slidably supporting said aileron control wheel, a nose wheel control wheel rotatably mounted with respect to said aileron control wheel, a bore in said nose wheel control wheel, a shaft keyed within said bore, said shaft being rotatably supported at one portion thereof by said aileron control wheel, said nose wheel control wheel and said shaft being able to rotate with respect to the aileron control wheel but otherwise rigid therewith, a second shaft universally connected to said first shaft, a bell crank assembly pivotally supported by said frame structure, a third shaft universally connected to said second shaft and rotatably supported in said bell crank assembly, a sheave keyed on said third shaft, a fourth shaft rotatably mounted in said bell crank assembly, a second sheave keyed thereon, a fifth shaft universally connected to said fourth shaft, said fifth shaft being rotatably supported by said frame structure, a third sheave keyed on said fifth shaft, cables connecting said first and second sheave, cables leading from said third sheave and operatively connected to the aircraft nose wheel, and means operatively connecting said bell crank assembly to the elevator control surfaces.

3. In a unitary control assembly, an aileron control wheel, a frame structure slidably supporting said aileron control wheel, a nose wheel control wheel rotatably mounted with respect to said aileron control wheel, a bore in said nose wheel control wheel, a shaft keyed within said bore, said shaft being rotatably supported at one portion thereof by said aileron control wheel, said nose wheel control wheel and said shaft being able to rotate with respect to the aileron control wheel but otherwise rigid therewith, a second shaft universally connected to said first shaft, a bell crank assembly pivotally supported by said frame structure, a third shaft universally connected to said second shaft and rotatably supported in said bell crank assembly, a sheave keyed on said third shaft, a fourth shaft rotatably mounted in said bell crank assembly, a second sheave keyed thereon, a fifth shaft universally connected to said fourth shaft, said fifth shaft being rotatably supported by said frame structure, the center of said universal connection between said fourth shaft and said fifth shaft coinciding with the hinge line of said bell crank assembly with respect to the said frame structure, a third sheave keyed on said fifth shaft, cables connecting said first and second sheave, cables leading from said third sheave and operatively connected to the aircraft nose wheel, and means operatively connecting said bell crank assembly to the elevator control surfaces.

4. In a unitary control assembly, an aileron control wheel, a tube rigid with said aileron control wheel, a frame structure, said frame structure supporting said tube slidably and rotatably, a nose wheel control wheel mounted rotatably in said aileron control wheel, a shaft universally connected to said nose wheel control wheel, a second shaft universally connected to said first shaft, a bell crank assembly rotatably supporting said second shaft and pivotally supported on said frame structure, a sheave keyed on said second shaft, means operatively connected to said sheave controlling the aircraft nose wheel, means operatively connected to said bell crank adapted to actuate the elevator control surfaces, and means operatively connected to said tube to control the aileron surfaces.

5. In a unitary control assembly, an aileron control wheel, a tube rigid therewith, a frame structure, said frame structure including a housing, a drum rotatably mounted in said housing, said drum being provided with radial flanges, a set of bearing housings carried rotatably by said flanges, roller bearings carried rotatably in said bearing housings, plates mounted pivotally on said flanges, bearing housings carried by said plates, roller bearings mounted rotatably in said housings, spring means connecting said drum and said pivotally mounted plates, tracks projected longitudinally from said tube, said tracks being supported by said roller bearings adapting said tube to translate within said drum and to cause rotation within said housing by said drum upon rotation of said tube, means operatively connected to said tube to actuate the elevator control surfaces upon translation of said tube, and means operatively connected to said drum to actuate the aileron surfaces upon rotation of said tube and said drum.

6. In a unitary control assembly, a tube having longitudinal tracks thereon, a wheel rigidly connected with said tube, a frame structure, a drum rotatably mounted in said frame structure, radial flanges on said drum, two sets of bearings adjacent either extremity of said drum, one of said bearing sets comprising on the one side of said tube, bearing housings rotatably mounted with respect to said flanges, roller bearings rotatably mounted in said bearing housings, said roller bearings bearing against one of said tracks, and on the other side, plates pivotally mounted on said flanges, bearing housings rotatably mounted on said plates, roller bearings rotatably mounted in said bearing housings, said roller bearings bearing against the other track, spring means connecting said plates and said drum, the other of said bearing sets comprising the same structure having however its respective pivotal plates mounted oppositely with respect to those of the first mentioned bearing sets, means operatively connected to said tube to actuate the elevator control surfaces upon translation of said tube, and means operatively connected to said drum to actuate the aileron surfaces upon rotation of said tube and said drum.

7. In a unitary control assembly, a frame structure, a drum rotatably mounted therein, said drum having radial flanges, a tube having diametrically opposed tracks thereon, said tube being slidably supported in said drum by bearing sets, said bearing sets including roller bearings rotatably mounted with respect to said drum and cooperating with one of said tracks on the one side of said drum and on the other side, plates pivotally mounted on said radial flanges and carrying rotatable roller bearings cooperating with said other track on said tube, said plates being mounted on an eccentric shaft rotatably supported by said radial flanges, spring means connecting said plates with said drum, means actuating said tube translatably or rotatably with respect to said frame structure, means operatively connected to said tube to actuate the elevator control surfaces upon translation of said tube, and means operatively connected to said drum to actuate the aileron surfaces upon rotation of said drum and said tube.

8. In a unitary control assembly, a frame structure, a drum rotatably mounted therein, said drum having radial flanges, a tube having diametrically opposed tracks thereon, said tube being slidably supported in said drum by bearing sets, said bearing sets including roller bearings rotatably mounted with respect to said drum and cooperating with one of said tracks on the one side of said drum and on the other side, plates pivotally mounted on said radial flanges and carrying rotatable roller bearings cooperating with said other track on said tube, said plates being mounted on an eccentric shaft rotatably supported by said radial flanges, spring means connecting said plates with said drum, a clamp pinned to said plates, said clamp encircling said eccentric shaft, means actuating said tube translatably or rotatably with respect to said frame structure, means operatively connected to said tube to actuate the elevator control surfaces upon translation of said tube, and means operatively connected to said drum to actuate the aileron surfaces upon rotation of said drum and said tube.

CARLTON G. PETERSON.

REFERENCES CITED

The following references are of record in the file of this patent:

UNITED STATES PATENTS

| Number | Name | Date |
| --- | --- | --- |
| 1,508,591 | Breguet | Sept. 16, 1924 |
| 1,900,068 | Mueller | Mar. 7, 1933 |
| 2,134,509 | Frank | Oct. 25, 1938 |
| 2,172,813 | Waterman | Sept. 12, 1939 |
| 2,173,538 | McKellar | Sept. 19, 1939 |
| 2,373,065 | Stevens | Apr. 3, 1945 |
| 2,417,725 | Zuck | Mar. 18, 1947 |
| 2,424,523 | Watter | July 22, 1947 |
| 2,424,889 | Holmes | July 29, 1947 |
| 2,457,884 | Fulton | Jan. 4, 1949 |

FOREIGN PATENTS

| Number | Country | Date |
| --- | --- | --- |
| 797,477 | France | Feb. 17, 1936 |